(12) United States Patent
Ohyama et al.

(10) Patent No.: US 8,379,764 B2
(45) Date of Patent: Feb. 19, 2013

(54) RECEIVING DEVICE AND CHANNEL ESTIMATION METHOD

(75) Inventors: Takahiro Ohyama, Miyagi (JP); Takenori Sakamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 302 days.

(21) Appl. No.: 12/992,253

(22) PCT Filed: Jul. 30, 2009

(86) PCT No.: PCT/JP2009/003628
§ 371 (c)(1),
(2), (4) Date: Nov. 11, 2010

(87) PCT Pub. No.: WO2010/023820
PCT Pub. Date: Mar. 4, 2010

(65) Prior Publication Data
US 2011/0064128 A1    Mar. 17, 2011

(30) Foreign Application Priority Data
Aug. 29, 2008 (JP) ................................. 2008-222097

(51) Int. Cl.
*H04L 27/06* (2006.01)
*H03D 1/00* (2006.01)
(52) U.S. Cl. .......................... 375/316; 375/320; 375/340
(58) Field of Classification Search ................... 375/259, 375/268, 269, 320, 316, 340; 329/347
See application file for complete search history.

(56) References Cited

U.S. PATENT DOCUMENTS
7,612,717 B2 * 11/2009 Daniele et al. ................ 342/465
2004/0213363 A1   10/2004 Bottomley 2008/0056419 A1 * 3/2008 Lee et al. ....................... 375/355
2010/0002749 A1 * 1/2010 Maggio et al. ................ 375/130
2010/0266053 A1 * 10/2010 Sakamoto et al. ............ 375/259

FOREIGN PATENT DOCUMENTS
| JP | 11-041137 | 2/1999 |
| JP | 2001-057526 | 2/2001 |
| JP | 2006-524971 | 11/2006 |
| JP | 2010057088 | * 3/2010 |

(Continued)

OTHER PUBLICATIONS
International Search Report dated Aug. 25, 2009.

(Continued)

*Primary Examiner* — Tesfaldet Bocure
(74) *Attorney, Agent, or Firm* — Dickinson Wright PLLC

(57) ABSTRACT

Disclosed are a receiving device and a channel estimation method that are capable of using the amplitude information of a received signal to perform proper channel estimation. In the device, a detection section (102) extracts the amplitude information of the OOK modulation signal sequence in which a known CES (Channel Estimation Sequence) composed of data "0" and "1" is OOK (On Off Keying)-modulated to obtain a detected signal sequence. A "1"-detection section (1042) extracts only the sample value corresponding to the data "1" from the sample values of the detected signal sequence to obtain an extracted signal sequence. A correlation calculating section (1043) performs the correlation calculation between the extracted signal sequence and the CES. A propagation delay estimation section (1044) estimates the propagation delay amount of a CIR (Channel Impulse Response) from the correlation calculation. An amplitude coefficient estimation section (1045) estimates the amplitude coefficient of the CIR from the correlation calculation.

8 Claims, 14 Drawing Sheets

FOREIGN PATENT DOCUMENTS

WO 2006/072378 7/2006

OTHER PUBLICATIONS

H. Yamaguchi, et al., "Equalization for Infrared Wireless Systems Using OOK-CDMA," IEICE Trans. Commun., vol. E85-B, No. 10, Oct. 2002, pp. 2292-2299.

H. Yamaguchi, et al., "Indoor Infrared Wireless Systems Using OOK-CDMA with Decision-Feedback Equalizer on Diffuse Channels," IEICE Technical Report, RCS2000-66, Jul. 2000, pp. 103-109, with English abstract.

* cited by examiner

RECEIVING DEVICE AND CHANNEL ESTIMATION METHOD

TECHNICAL FIELD

The present invention relates to a receiving apparatus and channel estimation method for performing channel estimation using amplitude information of received signals obtained by means of envelope detection and so forth, in a system using an on-off keying (OOK) modulation scheme.

BACKGROUND ART

In wireless communication, a signal transmitted from a transmitting antenna arrives at a receiving antenna through a plurality of routes. Signals having traveled through these routes of varying lengths are combined in a state these signals have different signal powers and phases, and the demodulation performance of the receiving apparatus is deteriorated. Consequently, in order to demodulate a signal correctly in the receiving apparatus, channel estimation is an important technology.

Generally, channel estimation is performed as follows: First, a channel estimation sequence (CES) is transmitted from the transmitting side to the receiving side. The receiving side prepares a known signal sequence that is the same as the channel estimation sequence transmitted from the transmitting side, and finds the correlation between that known signal sequence and a sequence detected by way of detection from a received signal.

In channel estimation, generally, coherent detection is used for the detection scheme. Next, from the correlation results obtained, positions where sharp peaks appear are detected as the times of arrival of the direct wave and delayed waves, and the amount of signal propagation delay is estimated. Consequently, in channel estimation, a signal sequence having a good autocorrelation characteristic is used as a channel estimation sequence. Then, based on the amount of propagation delay estimated, the magnitude of amplitude fluctuation due to inter-symbol interference is found, and an amplitude coefficient is detected.

For example, patent literature 1 discloses a method of improving the accuracy of channel estimation. With the method disclosed in patent literature 1, the receiving side receives a known signal sequence transmitted from a communicating party and finds a power delay profile by complex correlation processing of the known signal sequence and a received signal sequence. Then, the arrival time and magnitude of the direct wave component is detected from the delay profile, and a replica of the correlation value of the direct wave is generated. Next, the generated replica is subtracted from the delay profile (i.e. correlation results), so that the accuracy of estimation of the arrival time of delayed waves is improved. The method disclosed in patent literature 1 is premised on the use of coherent detection as the detection scheme.

CITATION LIST

Patent Literature

[PTL 1] Published Japanese Translation No. 2006-524971 of the PCT International Publication

SUMMARY OF INVENTION

Technical Problem

However, not all communication schemes use coherent detection as the detection scheme, and se using the method disclosed in patent literature 1 may not always improve the accuracy of channel estimation. For example in ultra wide band (UWB), in which a pulse signal is transmitted over a wide bandwidth, an on-off keying (OOK) modulation scheme is used, whereby data is transmitted based on whether or not there is a pulse. An OOK-modulation scheme associates data "1" and "0" with "pulse" and "no pulse," and, given that amplitude components alone carry information, oftentimes use envelope detection as the detection scheme.

In coherent detection, amplitude information and phase information are extracted from a received signal sequence, whereas, in envelope detection, only amplitude information is extracted from a received signal sequence. Consequently, when there are delayed waves on the propagation path, correlation results between a detected signal sequence obtained by means of envelope detection and a known signal sequence, and correlation results between a detected signal sequence obtained by means of coherent detection and a known signal sequence, are different. As a result of this, if a correlation result by envelope detection is used as is for channel estimation, because this correlation result does not include phase information, cases might occur where a good channel estimation result cannot be obtained.

Here, differences between a correlation result of an OOK-modulated signal by envelope detection and a correlation result of an OOK-modulated signal by coherent detection, will be explained with examples. In the following, an example case of using a CES of a length of 128 bits (formed with data "1" and "0") will be described. If the length of a CES is 128 bits, correlation results for 255 (=128×2−1) samples are obtained.

FIG. 1 shows correlation results between a detected signal sequence obtained by envelope detection and the original CES when there are no delayed waves on the propagation path. As shown in FIG. 1, when there are no delayed waves, a sharp peak appears only at the 128-th, center sample. This sharp peak indicates the presence of the direct wave, and serves as the reference time for the amount of propagation delay of delayed waves.

FIG. 2 shows correlation results between a detected signal sequence obtained by coherent detection and the original CES sequence when there are no delayed waves on the propagation path. As shown in FIG. 2, if coherent detection is performed when there are no delayed waves on the propagation path, similar to the case illustrated in FIG. 1, a peak appears only at the 128-th, center sample.

Thus, when there are no delayed waves on the propagation path, correlation results by envelope detection and correlation results by coherent detection match. Consequently, when there are no delayed waves, the same channel estimation result is provided when envelope detection is used and when coherent detection is used. On the other hand, when there are delayed waves on the propagation path, different correlation results are obtained. For example, channel impulse response (CIR): h(t) can be represented by following equation 1.

[1]

$$h(t)=a_1\delta(t-d_1)\exp(j\phi_1)+a_2\delta(t-d_2)\exp(j\phi_2) \quad \text{(Equation 1)}$$

In equation 1, the first term represents the direct wave, the second term represents a delayed wave, $\delta(t)$ is Dirac's delta function, $a_n$ represents the amount of amplitude attenuation, $d_n$ represents the amount of propagation delay, and $\phi_n$ represents the amount of phase rotation. For example, when $a_1=1$, $a_2=0.3$, $d_1=0$, $d_2=T$ (T is the symbol length), $\phi_1=0$, and $\phi_2=\pi$, the CIR is $h(t)=\delta(t)-0.3\delta(t-T)$.

FIG. 3 shows detection results by coherent detection, for example. FIG. 4 provides an enlarged view of the 120-th through 140-th samples in FIG. 3. As shown in FIG. 4, in coherent detection, a peak having the largest absolute value is detected at the 128-th sample and a peak having the next largest absolute value is detected at the 129-th sample. Consequently, the 128-th peak indicates that the direct wave has been detected, and the 129-th peak indicates that a delayed wave has been detected at a position of a one-symbol delay from the direct wave. Furthermore, the amplitude of the delayed wave is detected in a negative value, which makes it clear that the delayed wave interferes in anti-phase with the direct wave. In the event of using coherent detection, the time of arrival and phase of a delayed wave are detected correctly.

On the other hand, FIG. 5 shows correlation results by envelope detection. FIG. 6 provides an enlarged view of the 120-th through 140-th samples in FIG. 5. As shown in FIG. 6, peaks appear at the 128-th and 135-th samples. Consequently, even though a delayed wave really is supposed to be detected at the 129-th sample, a delayed wave is detected at the 135-th sample. Consequently when envelope detection is used, the arrival time of a delayed wave is calculated wrong.

Furthermore, a delayed wave interferences in anti-phase. Consequently, even though the amplitude of a delayed wave is supposed to be detected in a negative value, as shown in FIG. 5, in correlation results by envelope detection, the amplitude of a delayed wave is detected in a positive value, and a wrong phase relationship is detected between the direct wave and a delayed wave.

Consequently, when the there are delayed waves on the propagation path, if a correlation result by envelope detection is used as is for channel estimation, cases might occur where adequate channel estimation is difficult.

It is therefore an object of the present invention to provide a receiving apparatus and channel estimation method for performing adequate channel estimation using amplitude information of received signals.

Solution to Problem

A receiving apparatus according to the present invention employs a configuration having: a detection section that performs envelope detection of an on-off keying modulated signal sequence to obtain a detected signal sequence, the on-off keying modulated signal sequence being obtained by performing on-off keying of a known channel estimation sequence formed with data 0 and 1; an extracting section that extracts only a detected signal corresponding to data 1 from the detected signal sequence to obtain an extracted signal sequence; a correlation section that calculates a correlation between the extracted signal sequence and the channel estimation sequence; and an estimation section that estimates a channel characteristic based on a result of the correlation calculation.

A channel estimation method according to the present invention includes: performing envelope detection of an on-off keying modulated signal sequence and obtaining a detected signal sequence, the on-off keying modulated signal sequence being obtained by performing on-off keying of a known channel estimation sequence formed with data 0 and 1; extracting only a detected signal corresponding to data 1 from the detected signal sequence and obtaining an extracted signal sequence; calculating a correlation between the extracted signal sequence and the channel estimation sequence; and estimating a channel characteristic based on a result of the correlation calculation.

Advantageous Effects of Invention

With the receiving apparatus and channel estimation method of the present invention, it is possible to perform adequate channel estimation using amplitude information of received signals. Consequently, for instance, only the amplitude information of a received signal carries data information as in the case with an OOK-modulated signal, it is still possible to prevent the circuit from being large in size and complex.

DESCRIPTION OF EMBODIMENTS

Embodiments of the present invention will be described below with reference to the accompanying drawings.

Embodiment 1

Figure 7:
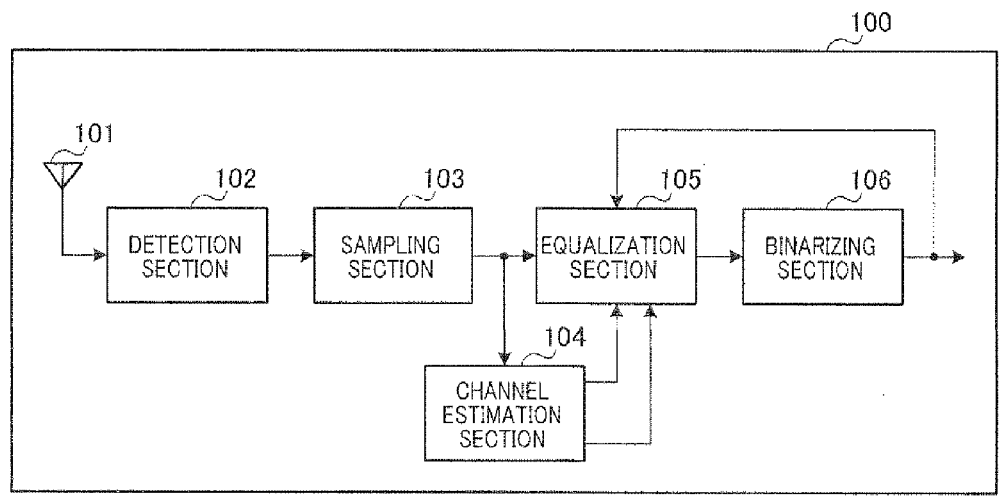
FIG. 7 is a block diagram showing a principal-part configuration of a receiving apparatus according to embodiment 1 of the present invention.

FIG. 7 shows a principal-part configuration of a receiving apparatus according to an embodiment of the present invention. Receiving apparatus 100 shown in FIG. 7 is configured with antenna 101, detection section 102, sampling section 103, channel estimation section 104, equalization section 105, and binarizing section 106.

Antenna 101 receives an OOK (on-off keying)-modulated signal sequence transmitted from a communicating party (not shown) and outputs the received signal sequence to detection section 102. According to the present embodiment, an OOK-modulated signal sequence, obtained by OOK-modulating a known channel estimation sequence (CES) formed with data "0" and "1," is transmitted from a communicating party.

Figure 8:
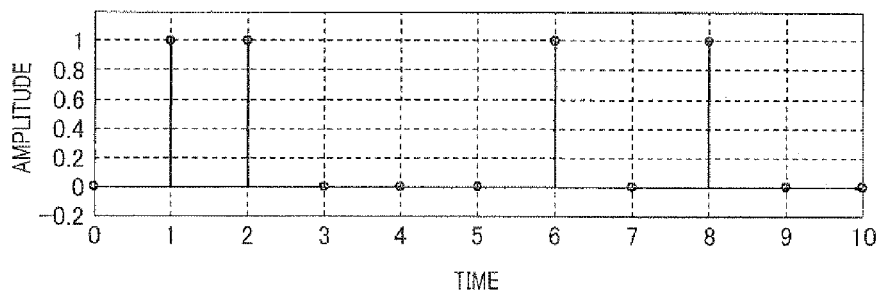
FIG. 8 shows an example of transmission data "0110001010"
Figure 9:
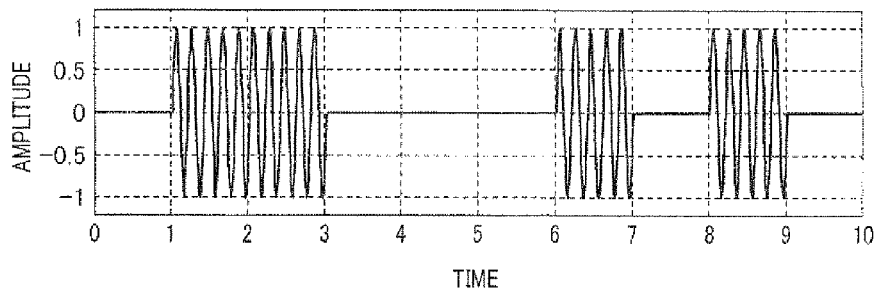
FIG. 9 shows a modulated signal obtained when the transmission data of FIG. 8 is OOK-modulated.

For example, when a channel estimation sequence (CES) of data "0110001010" is transmitted from a communicating party as shown in FIG. 8, an OOK-modulated signal of the waveform shown in FIG. 9 is derived from the channel estimation sequence (CBS). If there are no delayed waves on the propagation path, the OOK-modulated signal sequence shown in FIG. 9 is received in antenna 101.

If there are delayed waves on the propagation path, the OOK-modulated signal sequence is received in antenna 101 in varying waveforms. Now, a case will be considered below as an example where a channel impulse response (CIR): h(t) is represented by equation 2.

[2]

$$h(t) = a_1 \delta(t-d_1) \exp(j\phi_1) + a_2 \delta(t-d_2) \exp(j\phi_2) \quad \text{(Equation 2)}$$

In equation 2, the first term represents the direct wave and the second term represents a delayed wave. $\delta(t)$ represents Dirac's delta function. $a_n$, $d_n$, and $\phi_n$ (n=1, 2, ...) represent the amount of amplitude attenuation, the amount of propagation delay and the amount of phase rotation, respectively.

In equation 2, for example, if $a_1=1$, $a_2=0.3$, $d_1=0$, $d_2=T$ (T is the symbol length), $\phi_1=0$, and $\phi_2=\pi$, then, the channel impulse response is $h(t)=\delta(t)-0.3\delta(t-T)$. If the OOK-modulated signal sequence shown in FIG. 9 is transmitted in this environment, the received signal sequence arriving at antenna 101 has the waveform shown in FIG. 10.

The amount of propagation delay $d_2$ of a delayed wave is $d_2=T$ and the phase difference between the direct wave and the delayed wave is $\phi_2-\phi_1=\pi$, a delayed wave that is one symbol length T delayed, interferes in anti-phase with the direct wave. When the data immediately after data "1" is "1," the amplitude is attenuated by 0.3 by the interference of a delayed wave. On the other hand, when the data immediately after data "1" is "0," the amplitude increases by 0.3 by interference from a delayed wave.

Detection section 102 applies envelope detection to the received signal sequence received in antenna 101, and outputs the resulting detected signal sequence to sampling section 103.

Figure 11:
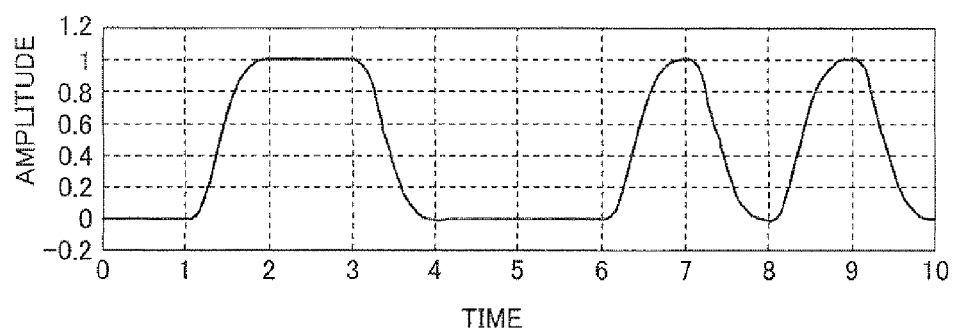
FIG. 11 shows a detected signal obtained by performing envelope detection with the OOK-modulated signal of FIG. 9.
Figure 12:
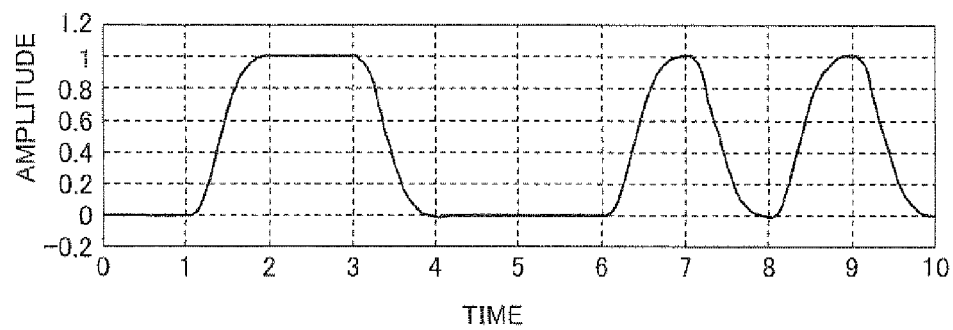
FIG. 12 shows a detected signal obtained by performing coherent detection with the OOK-modulated signal of FIG. 9.

For example, if envelope detection is applied to the OOK-modulated signal sequence shown in FIG. 9, the detected signal sequence shown in FIG. 11 is obtained. FIG. 12 shows a detected signal sequence obtained by coherent detection. Comparison of FIG. 11 and FIG. 12 reveals that, when there are not delayed waves on the propagation path, a detected signal sequence obtained by envelope detection and a detected signal sequence obtained by coherent detection have virtually identical waveforms.

Figure 10:
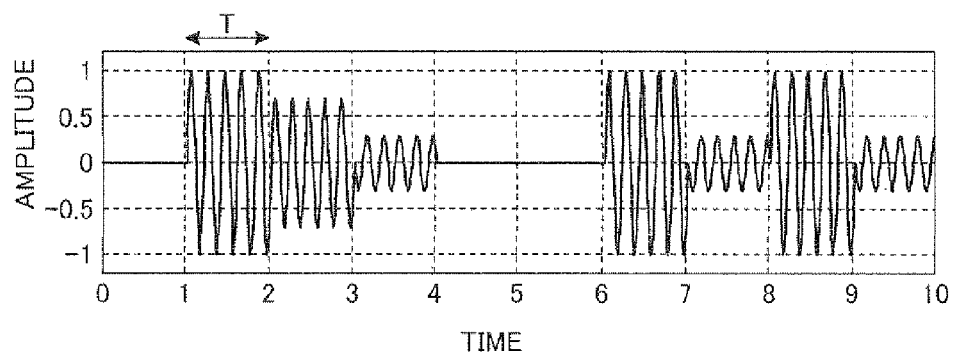
FIG. 10 shows an example of a received signal in the event there are delayed waves.
Figure 13:
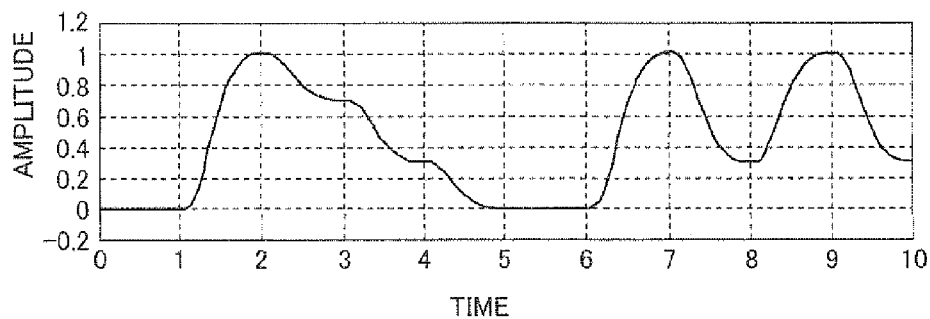
FIG. 13 shows a detected signal obtained by performing envelope detection with the OOK-modulated signal of FIG. 10.
Figure 14:
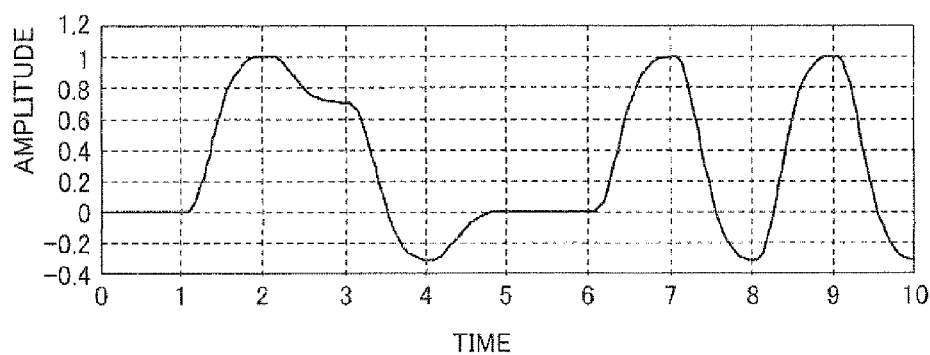
FIG. 14 shows a detected signal obtained by performing coherent detection with the OOK-modulated signal of FIG. 10.

When there are delayed waves on the propagation path, a detected signal sequence obtained by envelope detection and a detected signal sequence obtained by coherent detection have different waveforms. Applying envelope detection to the OOK-modulated signal sequence shown in FIG. 10 gives the detected signal sequence shown in FIG. 13. Also, FIG. 14 shows the waveform of a detected signal sequence obtained by applying coherent detection to the OOK-modulated signal sequence shown in FIG. 10. Comparison between FIG. 13 and FIG. 14 reveals that the amplitude in parts of data "1" interfered with by delayed waves, is reduced by 0.3 in both figures. On the other hand, as with parts of "0" interfered with by delayed waves, in the detected signal obtained by envelope detection, the amplitude has positive amplitude values, whereas, in the detected signal sequence by coherent detection, the amplitude has negative amplitude values, giving different results.

As mentioned above, in envelope detection, only amplitude information is extracted from a received signal sequence. Consequently, as is clear from the comparison of FIG. 13 and FIG. 11, the amplitude in parts of data "0" (see time 4) interfered with by delayed waves, is increased by 0.3. On the other hand, in coherent detection, phase information is extracted in addition to amplitude information. Consequently, as is clear from the comparison of FIG. 14 and FIG. 12, the amplitude in parts of data "1" interfered with by delayed waves, is reduced by 0.3 in FIG. 14 (see time 4).

Thus, in envelope detection, the amplitude of a detected signal corresponding to data "0" increases on a constant basis regardless of the amount of phase rotation of a delayed wave, that is, whether or not the phase of a delayed wave is in in-phase or anti-phase with the direct wave. Consequently, using a detected signal sequence obtained by envelope detection as is in channel estimation does not always give an adequate channel estimation result. To be more specific, if detected signals corresponding to data "0" in a detected signal sequence obtained by envelope detection are used in channel estimation, cases might occur where adequate channel estimation is difficult.

Consequently, according to the present embodiment, channel estimation section 104 is designed to perform channel estimation using only the correlation results corresponding to parts where the original data is "1" in the received CES (channel estimation sequence). As described earlier, even when a detected signal obtained by envelope detection is used, the amplitude of a detected signal corresponding to data "1" increases and decreases correctly according to the amount of phase rotation of a delayed wave as in the case of using a detected signal obtained by coherent detection. On the other hand, when a detected signal obtained by envelope detection is used, the amplitude of a detected signal corresponding to data "0" increases on a constant basis regardless of the amount of phase rotation of a delayed wave. Consequently, channel estimation is performed using only correlation results corresponding to parts where the original data is "1" in the received CES (channel estimation sequence). By this means, channel estimation is performed using only parts correctly reflecting the amount of phase rotation of a delayed wave, in a detected signal sequence obtained by envelope detection. The method of channel estimation in channel estimation section 104 will be described later.

Sampling section 103 samples a detected signal sequence output from detection section 102 at a predetermined timing, and outputs the resulting sample values to channel estimation section 104 and equalization section 105.

Figure 15:
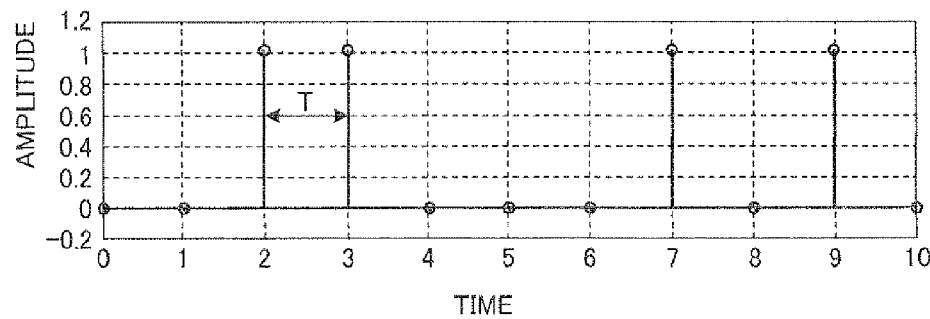
FIG. 15 shows sample values obtained by sampling the detected signal of FIG. 11.
Figure 16:
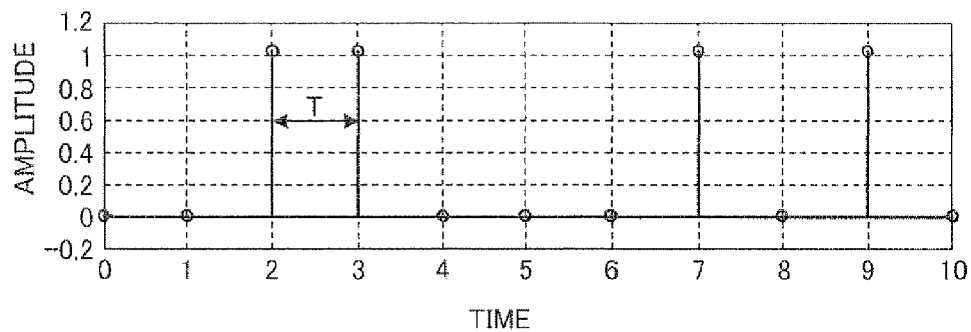
FIG. 16 shows sample values obtained by sampling the detected signal of FIG. 12.

In an example case where there are no delayed waves on the propagation path, the sample values shown in FIG. 15 are obtained by sampling the detected signal sequence after envelope detection shown in FIG. 11 by sampling rate 1/T (where T is the symbol length). FIG. 16 shows the sample values of the detected signal sequence after coherent detection shown in FIG. 12. As obvious from the comparison of FIG. 15 and FIG. 16, when there are no delayed waves on the propagation path, sample values of a detected signal sequence obtained by envelope detection and sample values of a detected signal sequence obtained by coherent detection assume substantially the same values.

Figure 17:
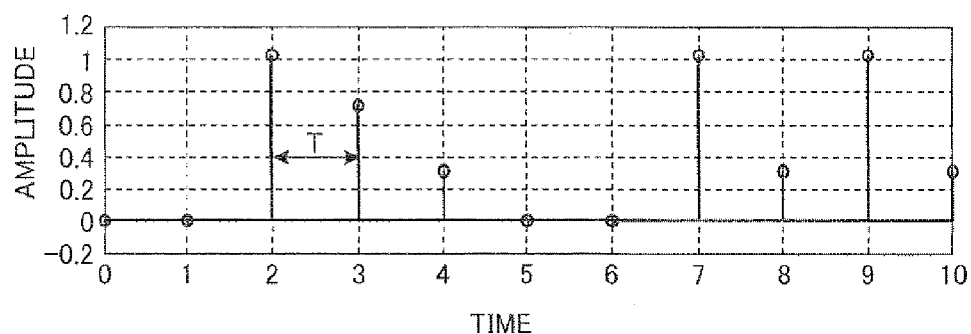
FIG. 17 shows sample values obtained by sampling the detected signal of FIG. 13.
Figure 18:
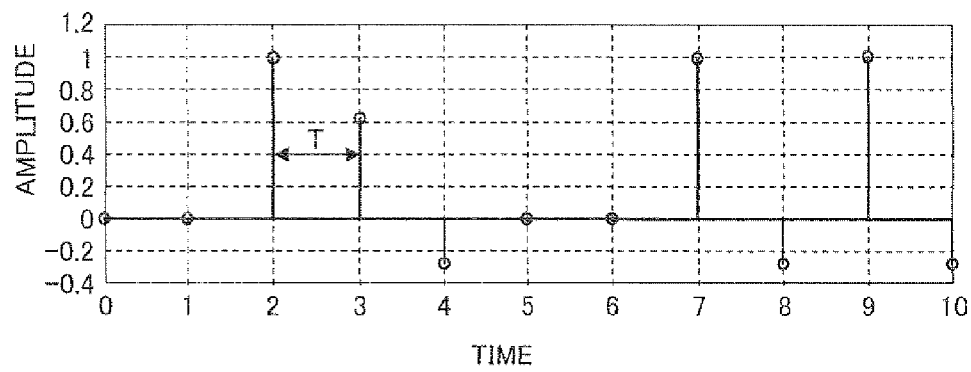
FIG. 18 shows sample values obtained by sampling the detected signal of FIG. 14.

On the other hand, when there are delayed waves on the propagation path, samples values vary depending on the detection scheme. FIG. 17 shows sample values of the detected signal sequence after envelope detection shown in FIG. 13. FIG. 18 shows sample values of the detected signal sequence after coherent detection shown in FIG. 14. As obvious from the comparison of FIG. 17 and FIG. 18, when there are delayed waves on the propagation path, sample values of a detected signal sequence obtained by envelope detection and sample values of a detected signal sequence obtained by coherent detection assume different values.

Channel estimation section 104 performs channel estimation using sample values output from sampling section 103. Channel estimation here refers to estimating the amount of propagation delay and amplitude coefficient of the channel impulse response (CIR). The method of channel estimation in channel estimation section 104 according to the present embodiment will be described in detail later. Channel estimation section 104 outputs the estimated amount of propagation delay and amplitude coefficient to equalization section 105.

Equalization section 105 equalizes the sample values output from sampling section 103. To be more specific, equalizing section 105 performs amplitude correction of the sample values using the amount of propagation delay and amplitude coefficient estimated in channel estimation section 104 and past demodulation results demodulated in binarizing section 106. The method of amplitude correction in equalization section 105 will be described in detail later. Equalization section 105 outputs the sample values after amplitude correction to binarizing section 106.

Binarizing section 106 demodulates the received data by comparing the sample values after amplitude correction output from equalization section 105, with predetermined threshold Th, and binarizing the results. Binarizing section 106 feeds back the demodulation result to equalization section 105.

Next, the internal configuration and channel estimation method in channel estimation section 104 will be described below. Channel estimation section 104 performs channel estimation using only correlation results corresponding to parts where the original data is "1" in a received CES (channel estimation sequence).

Figure 19:
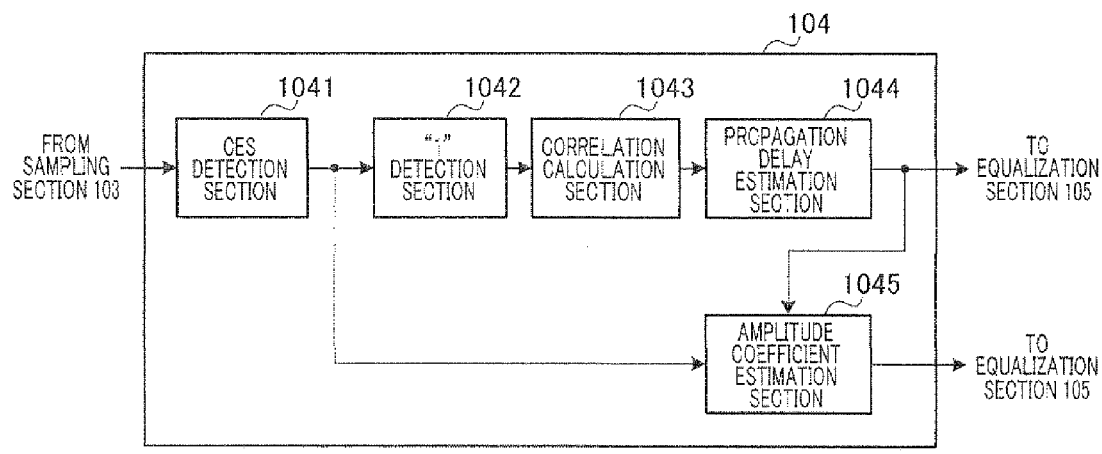
FIG. 19 is a block diagram showing a principal-part configuration of a channel estimation section according to embodiment 1.

FIG. 19 shows a principal-part configuration of channel estimation section 104. Channel estimation section 104 shown in FIG. 19 is comprised of CES detection section 1041, "1" detection section 1042, correlation calculation section 1043, propagation delay estimation section 1044 and amplitude coefficient estimation section 1045.

CES detection section 1041 detects the CES period in a received signal. The method of CES detection is not particularly limited and various methods can be used. For example, a detection method, in which CES detection section 1041 has a matched filter and determines that a CES has been detected when a matched filter output exceeds a predetermined value, may be used. CES detection section 1041 outputs the detected CES to "1" detection section 1042 and amplitude coefficient estimation section 1045.

"1" detection section 1042 extracts only the parts where the original data is "1" in the CES detected in CES detection section 1041, replaces the sample values of the parts where the original data is "0" with "0," and forms a new CES as an extracted signal sequence. By performing the calculation of equation 3, detection section 1042 is able to realize the above processing.

[3]

$$CE_1(n)=CE_r(n) \times CE(n)(n=1,2,\ldots) \quad \text{(Equation 3)}$$

In equation 3, CE(n) is the original CES, and $CE_r(n)$ is a CES detected in CES detection section 1041. The operator "x" represents the multiplication of each CES element, and $CE_1(n)$ is a CES formed as a new extracted signal sequence. The transmitting and receiving apparatuses use a common signal sequence as the CES, so that the receiving side is able to prepare in advance a CES that is the same as the transmitted CES.

Figure 20:
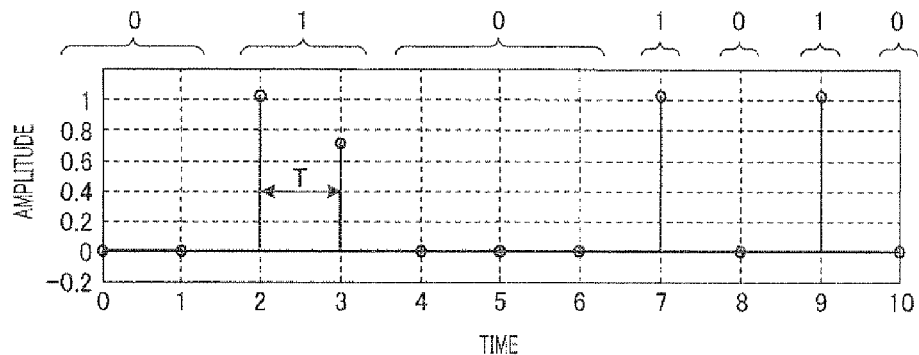
FIG. 20 shows a result of extracting parts of data "1" from the sample values of FIG. 17.

FIG. 20 shows a signal sequence (a newly formed CES) obtained by applying the processing of equation 3 to the signal sequence shown in FIG. 17. As shown in FIG. 20, in all parts of data "0," the amplitude is replaced with "0." "1" detection section 1042 outputs the newly formed CES ($CE_1$ (n)) to correlation calculation section 1043.

Figure 1:
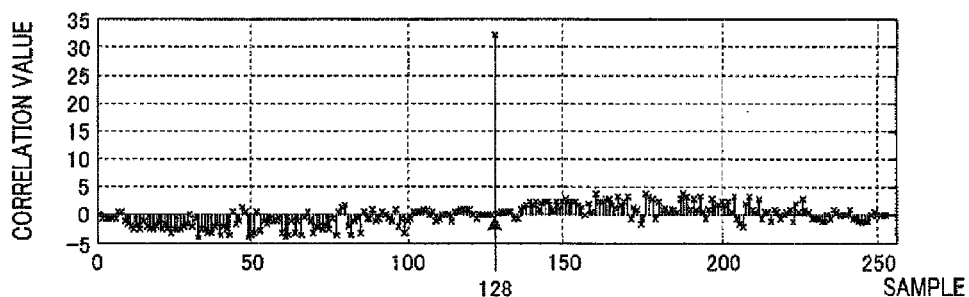
FIG. 1 shows an example of correlation results in the event envelope detection is used.
Figure 2:
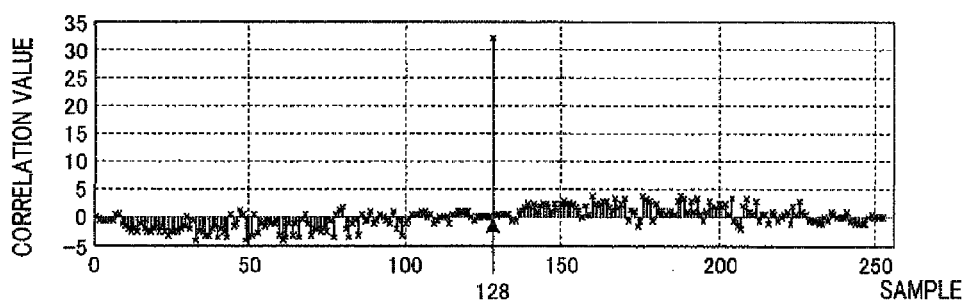
FIG. 2 shows an example of correlation results in the event coherent detection is used.
Figure 3:
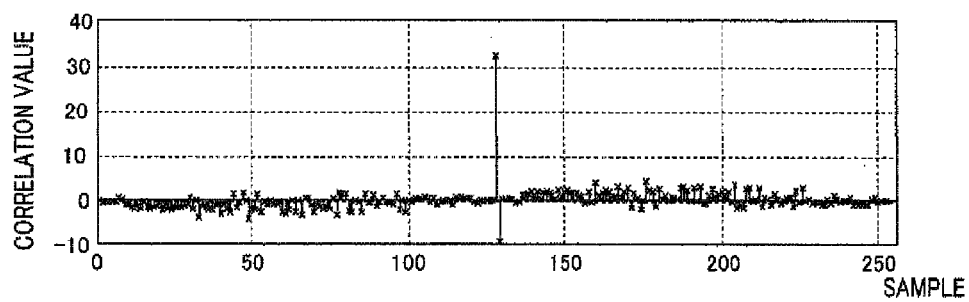
FIG. 3 shows an example of correlation results in the event envelope detection is used.
Figure 4:
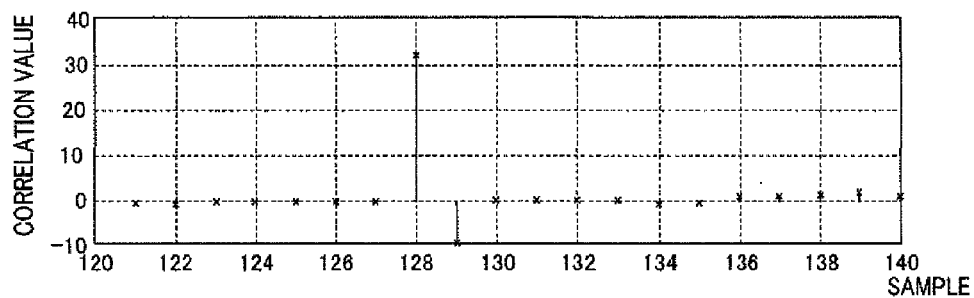
FIG. 4 shows an enlarged view of FIG. 3.
Figure 5:
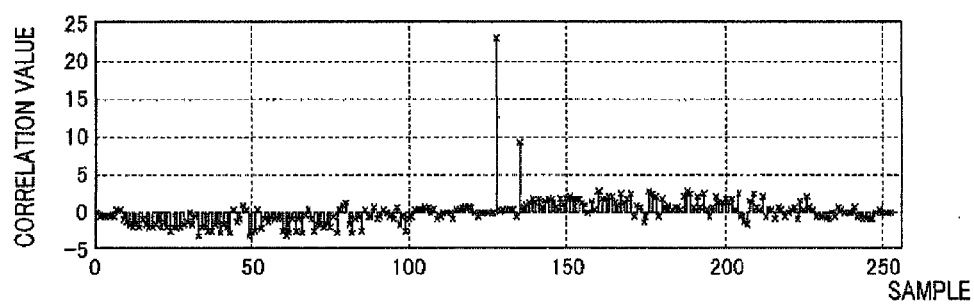
FIG. 5 shows an example of correlation results in the event envelope detection is used in an environment where there are delayed waves.
Figure 6:
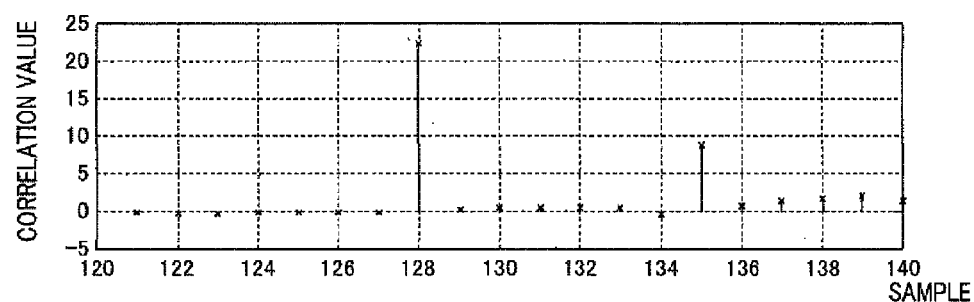
FIG. 6 shows an enlarged view of FIG. 5.
Figure 21:
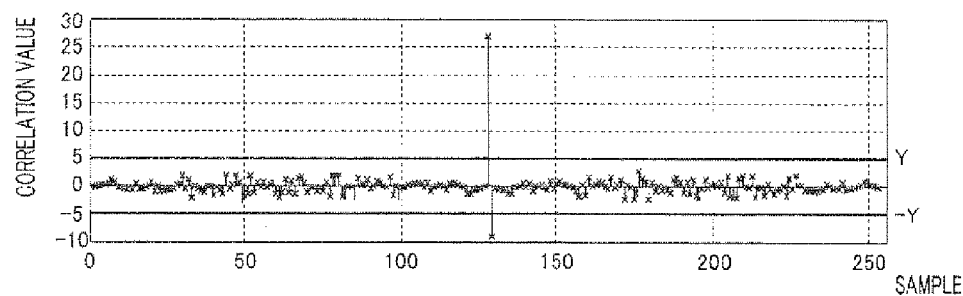
FIG. 21 shows correlation results in the event only parts of data "1" in a channel estimation sequence are used.
Figure 22:
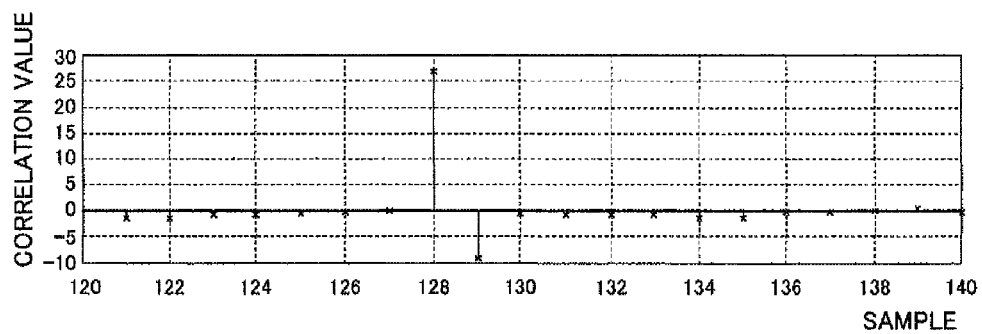
FIG. 22 shows an enlarged view of FIG. 21.

Correlation calculation section 1043 calculates the correlation between $CE_1(n)$ and CE(n). FIG. 21 shows an example of correlation calculation results. FIG. 22 shows an enlarged view of the 120-th through 140-th samples in FIG. 21. As obvious from the comparison of FIG. 22 and FIG. 6, in FIG. 22, the peak at the 135-th sample is not present and instead a peak appears at the 129-th sample. Furthermore, in FIG. 22, an amplitude coefficient is detected in a negative value.

That is to say, "1" detection section 1042 replaces the sample values in parts where the original data is "0" with "0," so that the influence of delayed waves of parts not correctly reflecting the amount of phase rotation, is cancelled. On the other hand, the sample values in parts of data "1" reflect the amount of phrase rotation correctly, so that "1" detection section 1042 detects only parts where the original data is "1" in the CES. By this means, correlation calculation section 1043 is able to obtain correlation calculation results using a detected signal sequence including information about the amount of phase rotation. By this means, even when detection section 102 adopts envelope detection, the correlation calculation results reflect the amount of propagation delay and amount of phase rotation of a delayed wave correctly.

Correlation calculation section 1043 outputs the obtained correlation results to propagation delay estimation section 1044.

Propagation delay estimation section 1044 detects a point among the correlation results where the absolute correlation value exceeds predetermined value Y, as signal arrival time $u_n(n=1, 2, \ldots )$. Next, propagation delay estimation section 1044 calculates propagation delay amount $d_n$ from detected arrival time $u_n$. Propagation delay amount $d_n$ is the relative difference in time between the arrival time of the direct wave and the arrival time of a delayed wave, and propagation delay estimation section 1044 obtains $d_n$, from equation 4.

[4]

$$d_n = u_n - u_1 (n=1,2,\ldots) \qquad \text{(Equation 4)}$$

For example if Y=5 in FIG. 21, $u_1=128$ is calculated as the arrival time of the direct wave and $u_2=129$ is calculated as the arrival time of a delayed wave. Consequently, propagation delay estimation section 1044 obtains $d_1=u_1-u_1=128-128=0$ as direct wave propagation delay amount $d_1$. Furthermore, propagation delay estimation section 1044 obtains $d_2=u_2-u_1=129-128=1$ as direct wave propagation delay amount $d_2$. By this means, the delayed wave is detected to be one-symbol length delayed from the direct wave.

Propagation delay estimation section n1044 outputs propagation delay amount $d_n$ to amplitude coefficient estimation section 1045 and equalization section 105.

Amplitude coefficient estimation section 1045 estimates amplitude coefficient $A_n$ of the channel impulse response using the CES output from CES detection section 1041 (CEA) in equation 3) and propagation delay amount $d_n$, estimated in propagation delay estimation section 1044, and outputs estimated amplitude coefficient $A_n$ to equalization section 105.

Amplitude coefficient $A_n$ is defined as follows. Although equation 2 includes the amount of amplitude attenuation, $a_n$, and the amount of phase rotation, $\phi_n$, amplitude coefficient estimation section 1045 combines these and outputs $A_n=a_n \exp(j\phi_n)$ as an amplitude coefficient. In other words, equation 2 can be represented as in equation 5 below.

[5]

$$h(t)=A_1\delta(t-d_1)+A_2\delta(t-d_2) \qquad \text{(Equation 5)}$$

Assuming that the amplitude when data "1" is received in a state there is no delayed wave interference is C and the amplitude when data "0" is received in a state there is no delayed wave interference is Z, amplitude coefficient $A_n$ can be determined by the following calculation processes [1] through [4]. Given that a CES is a known signal sequence and the amount of propagation delay is obtained in advance, data "1" not interfered with by delayed waves and data "0" not interfered with by delayed waves, can be identified in the CES period. Amplitude C can be set from the amplitude value of data "1" not interfered with by delayed waves, and amplitude Z can be set from the amplitude value of data "0" not interfered with by delayed waves.

[1] When the currently received data is "0" and the data $d_2-d_1$ symbols earlier is "1," if the sample value of the currently received data is $S_1$, amplitude fluctuation $D_1$ which a delayed wave causes to data "0" is estimated by the calculation of equation 6.

[6]

$$D_1=S_1-Z \qquad \text{(Equation 6)}$$

[2] When the currently received data is "1" and the data d2–d1 symbols earlier is "1," if the sample value of the currently received data is S2, amplitude fluctuation D2 which a delayed wave causes to data "0" is estimated by the calculation of equation 6.

[7]

$$D_2=S_2-C \qquad \text{(Equation 7)}$$

[3] Direct wave amplitude coefficient $A_1$ is equal to C (equation 8).

[8]

$$A_1=C \qquad \text{(Equation 8)}$$

[4] Delayed wave amplitude coefficient $A_2$ varies depending on the currently received data, as shown in equation 9.

[9]

$$A_2 = \begin{cases} D_1 & \text{(when the currently received data is ``0'')} \\ D_2 & \text{(when the currently received data is ``1'')} \end{cases} \qquad \text{(Equation 9)}$$

When the channel impulse response (CIR) is represented by a composite wave comprised of three or more waves, the same calculation processes as in [1] and [2] above are performed to calculate the amplitude fluctuation which each delayed wave causes to data "0" and data "1."

By this means, channel estimation section 104 estimates propagation delay amount $d_n$, amplitude fluctuations $D_1$ and $D_2$, and amplitude coefficient $A_n$, and outputs estimated propagation delay amount $d_n$, amplitude fluctuations $D_1$ and $D_2$, and amplitude coefficient $A_n$ to equalization section 105.

Next, the method of equalization in equalization section will be described.

Equalization section 105 is corrects the amplitude of sample value $S_n(n=1, 2, \ldots )$ based on propagation delay amount $d_n$, amplitude fluctuations $D_1$ and $D_2$, amplitude value Z of data "0" in a CES that is not interfered with by delayed waves, amplitude value C of data "1" in a CES that is not interfered with by delayed waves, and earlier data demodulation results demodulated in binarizing section 106. In the following, the method of equalization in equalization section 105, that is, the amplitude correction method, will be described below assuming a case where the channel impulse result is represented by equation 10 below based on the channel estimation result in channel estimation section 104. In equation 10, $|A_1|>|A_2|$, that is, the amplitude of a delayed wave is lower than the amplitude of the direct wave.

[10]

$$h(t)=A_1\delta(t-d_1)+A_2\delta(t-d_2) \qquad \text{(Equation 10)}$$

Equalization section 105 corrects sample value $S_n$ as follows based on the value of $D_2$ and earlier symbol demodulation results. In the event there are no delayed Waves, equalization section 105 holds in advance amplitude C when data "1" is received, amplitude Z when data "0" is received and threshold $Th=(C-Z)/2+Z$ used in binarizing section 106.

[1] When $D_2>0$ and the demodulation result $d_2-d_1$ symbols earlier is "1," a delayed wave is combined in-phase with the direct wave. Equalization section 105 then corrects the amplitude of sample value $S_n$ as in (i) through (iii) below.

(i) When $S_n>C$, the amplitude of sample value $S_n$ is corrected as $S_n-D_2$. That is, equalization section 105 cancels the influence of a delayed wave ($D_2$) combined in in-phase, from sample value $S_n$ of received data "1." By this means, equalization section 105 corrects a sample value received larger than the original value, to the original value.

(ii) When $S_n<Th$ and $D_1<(Th-Z)$, the amplitude of sample value $S_n$ is corrected as $S_n-D_1$. When $S_n<Th$, two eases are possible: (a) data is "0" yet the amplitude is increased by the influence of a delayed wave; and (b) data is "1" yet the amplitude is decreased due to the influence of the propagation path. Then, equalization section 105 compares $D_1$ and $(Th-Z)$ and determines which case applies. $(Th-Z)$ is the margin until data "1" is identified when the data really is "0." Consequently, when $D_1$, by which a delayed wave causes influence against data "0," is smaller than the margin $(Th-Z)$, it is possible to identify case (a) of data "0." Then, when $S_n<Th$ and $D_1<(Th-Z)$, equalization section 105 performs correction such that the influence of a delayed wave ($D_1$) is canceled from sample value $S_n$.

(iii) When $C>_n \geq Th$ and $D_1 \geq (Th-Z)$, the amplitude of sample value $S_n$ is corrected as $S_n-D_1$. When $C>S_n \geq Th$, two cases are possible: (a) data is originally "0" yet the amplitude is increased by the influence of the propagation path; and (b) data is originally "1" yet the amplitude is decreased due to the influence of the propagation path. Then, equalization section 105 compares $D_1$ and $(Th-Z)$ and determines which case applies. As explained in (ii), $(Th-Z)$ is the margin until data "1" is identified when the data really is "0." That is to say, when $D_1 \geq (Th-Z)$ is satisfied, it is possible to identify case (a). Then, when $C>S_n \geq Th$ and $D_1 \geq (Th-Z)$, equalization section 105 performs correction such that the influence of a delayed wave ($D_1$) is canceled from sample value $S_n$.

[2] When $D_2<0$ and the demodulation result $d_2-d_1$ symbols earlier is "1," a delayed wave is combined in anti-phase with the direct wave. Equalization section 105 corrects sample value $S_n$ as in (i) through (v) below. The concept of correction is the same as in [1] and will not be described here in detail.

(i) When $S_n \geq th$, $D_1<(Th-Z)$ and $|D_2|<(Th-Z)$, the amplitude of sample value $S_n$ is corrected as $S_n+|D_2|$.

(ii) When $Sn<Th$, $D_1<(Th-Z)$ and $|D_2|<(Th-Z)$, the amplitude of sample value $S_n$ is corrected as $S_n-D_1$.

(iii) When $S_n \geq Th$, $D_1 \geq (Th-Z)$ and $|D_2| \geq (Th-Z)$, the amplitude of sample value $S_n$ is corrected as $S_n-D_1$.

(iv) When $S_n<Th$, $D_1 \geq (Th-Z)$, and $|D_2| \geq (Th-Z)$, the amplitude of sample value $S_n$ is corrected as $S_n+|D_2|$.

(v) When $D_1 \geq (Th-Z)$ and $|D_2|<(Th-Z)$, $|S_n-D_1-Z|$ and $|S_n+|D_2|-C|$ are compared, and the one of the smaller value between $(S_n-D_1)$ and $(S_n+|D_2|)$ is employed as the value after correction.

Instead of [1] and [2], it is also possible to compare $|S_n-D_1-Z|$ and $|S_n-D_2-C|$ and employ the one of the smaller value between $(S_n-D_1)$ and $(S_n-D_2)$ as the value after correction. As described earlier, amplitude Z is the value obtained when data "0" is received without being influenced by delayed waves, and amplitude C is the value obtained when data "1" is received without being influenced by delayed waves.

That is, $|S_n-D_1-Z|$ shows how much sample value $S_n$ deviates from ideal amplitude Z, and $|S_n-D_2-C|$ represents how much sample value $S_n$ deviates from ideal amplitude C. Consequently, by comparing $|S_n-D_1-Z|$ and $|S_1-D_2-C|$ and employing the one that is deviated less, the more reliable correction result between $(S_n-D_1)$ and $(S_n-D_2)$ after correction is employed.

When the channel impulse response (CIR) is represented by a composite wave comprised of three or more waves, in addition to the above, the same operations are performed when the demodulation result time $d_n-d_1$ symbols earlier is "1," and when the demodulation results times $d_{n-1}-d_1$ and $d_n-d_1$ symbols earlier are "1."

Thus, equalization section 105 corrects (equalizes) the amplitude of sampling value $S_n$ ($n=1, 2, \ldots$) based on propagation delay amount $d_n$, amplitude values C and Z of a CES when data "0" and "1" are received in a state where there are no delayed waves, amplitude fluctuations $D_1$ and $D_2$ which delayed waves cause to data "0" and "1" in a CES, and earlier data demodulation results.

The method of equalization (the method of amplitude correction) is not limited to the method described above, and other methods may be used, using the channel impulse response (CIR) estimated in channel estimation section 104. For example, it is possible, with a general DFE (Decision Feedback Equalizer), to set the amplitude coefficient estimated in channel estimation section 104 as a digital filter coefficient.

However, the amplitude coefficient varies depending on whether received data is "0" or "1." Consequently, it is necessary to prepare a digital filter, which assumes data is "0," and a digital filter, which assumes data is "1," and outputs the one between the two filter outputs having the greater likelihood as the demodulation result.

As described above, according to the present embodiment, detection section 102 extracts amplitude information of an OOK-modulated signal sequence, obtained by OOK-modulating a known CES formed with data "0" and data "1," to obtain a detected signal sequence. Also, "1" detection section 1042 detects only sample values corresponding to data "1" from the sample values of the detected signal sequence to obtain an extracted signal sequence. Correction calculation section 1043 calculates the correlation between the extracted signal sequence and the CES, and propagation delay estimation section 1044 estimates the amount of propagation delay of the channel impulse response (CIR) from the correlation calculation. Amplitude coefficient estimation section 1045 estimates the amplitude coefficient of the channel impulse response (CIR) from the correlation calculation.

By this means, for example, when amplitude information alone carries data information, as with the case with an OOK-modulated signal, channel estimation is performed using correlation calculation results obtained only from amplitude information reflecting the amount of phase rotation of a delayed wave correctly. By this means, it is possible to use the detection method used for demodulation to support envelope detection, prevent the circuitry from being complex and large in size and perform adequate channel estimation.

Embodiment 2

A case has been described above with embodiment 1 where the transmission rate is the same between a channel estimation sequence and other parts (for example, payload). That is to say, sampling section 103 performs sampling using the same transmission rate between a channel estimation sequence and other parts.

According to the present embodiment, a receiving apparatus and channel estimation method that are applicable when the transmission rate varies between a channel estimation sequence and other parts, will be described. An example ease will be described below where the CES bit rate (which is the same as the symbol rate in OOK) is half the payload bit rate.

Generally speaking, when the transmission rate varies between the CES and the payload, if different sampling rates are used for the CES and the payload, two sampling rate are required, and this makes the apparatus configuration complex. Consequently, sampling is performed using the payload bit rate having the faster transmission rate.

Consequently, when the payload bit rate is $B_p(1/T)$ and the CES bit rate $B_{CES}$ is $B_{CES}=B_p/2(\frac{1}{2}T)$, the payload and the CES are both sampled by sampling rate $B_p(1/T)$. As a result, two sampling results are obtained from one CES bit. For example, from a CES of 128 bits, 256 samples are obtained as a sampling result.

Figure 23:
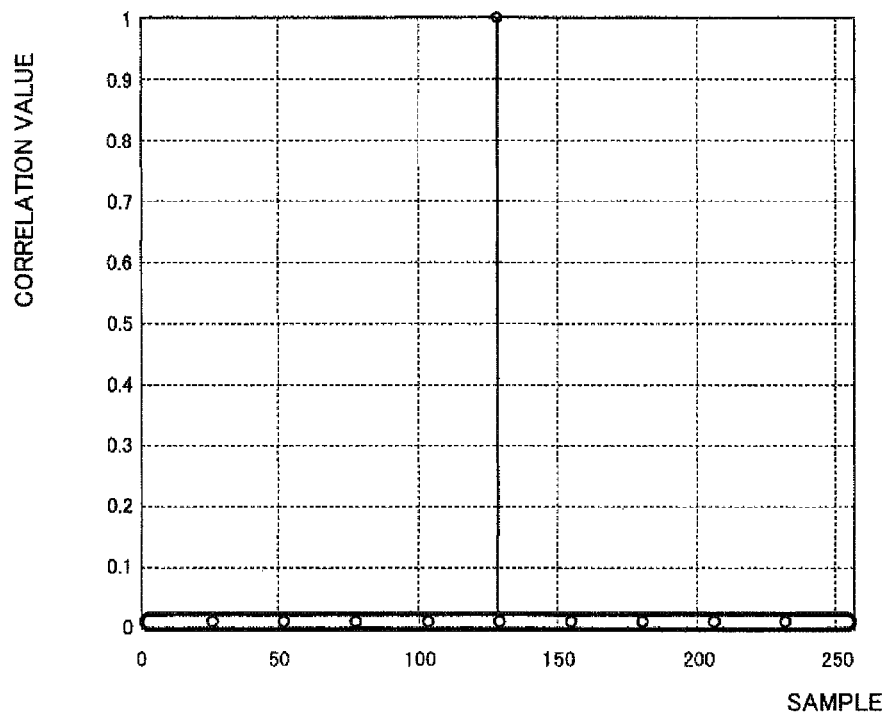
FIG. 23 shows autocorrelation results of a CES that provides an impulse autocorrelation result.
Figure 24:
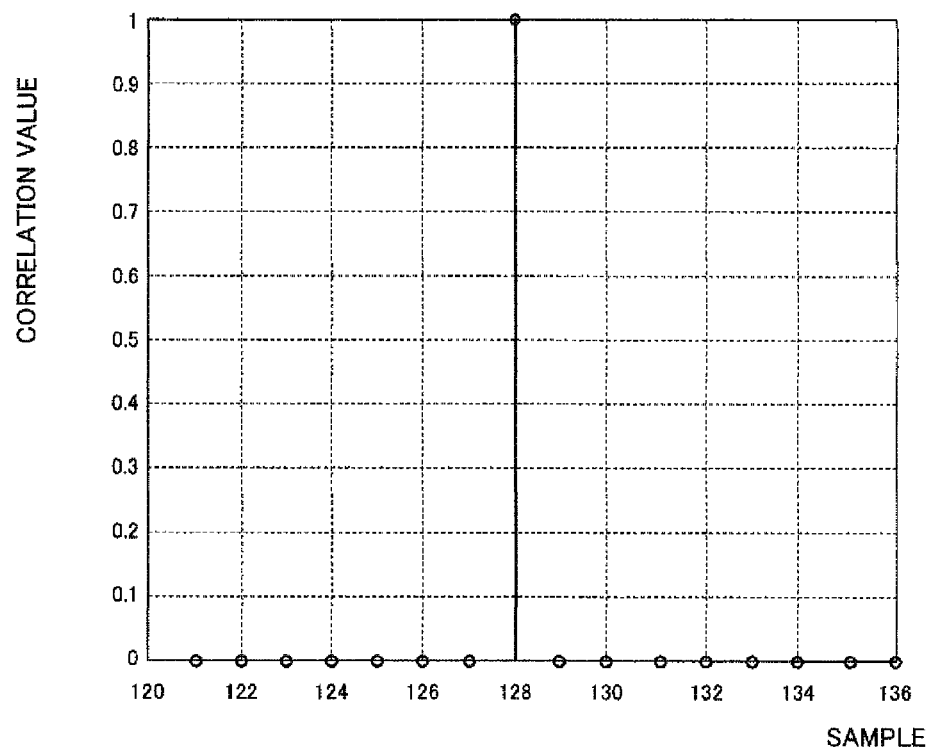
FIG. 24 shows an enlarged view of FIG. 23.

Now, a CES that provides an impulse autocorrelation result will be considered. FIG. 23 shows a correlation result of a case where the CES is sampled at the same rate as the CES bit rate $B_{CES}(=B_p/2)$. FIG. 24 shows an enlarged view of the 120-th through 136-th correlation values in FIG. 23. When sampling is performed by the same rate as CES bit rate $B_{CES}$, the correlation value at the 128-th sample shows a peak value and the other correlation values are zero.

Figure 25:
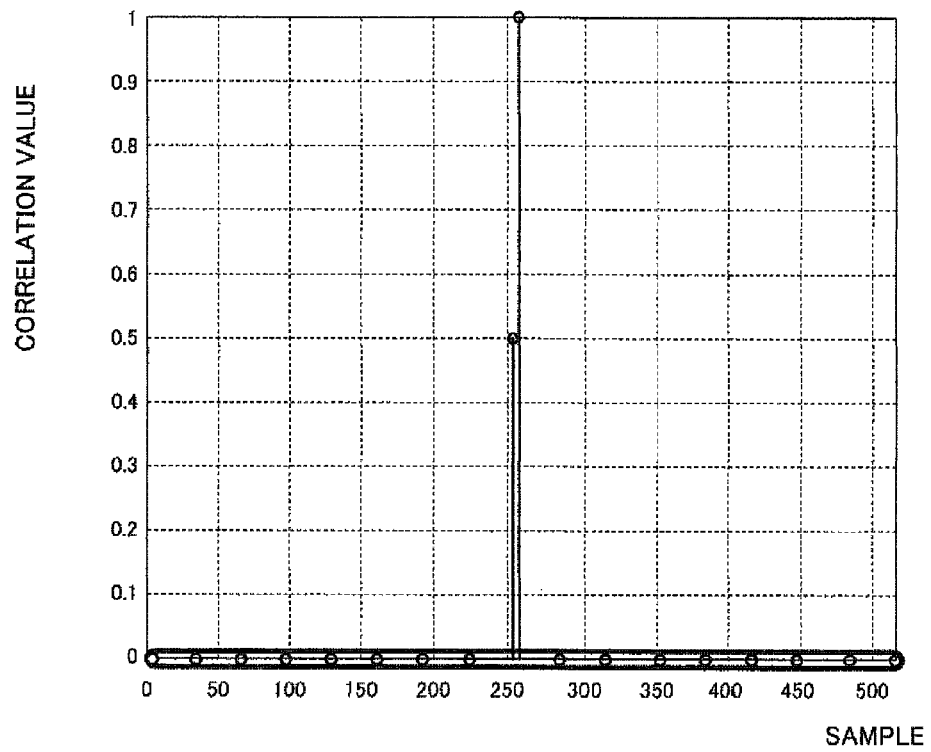
FIG. 25 shows autocorrelation results in the event a CES that provides an impulse autocorrelation result is sampled at a double rate.
Figure 26:
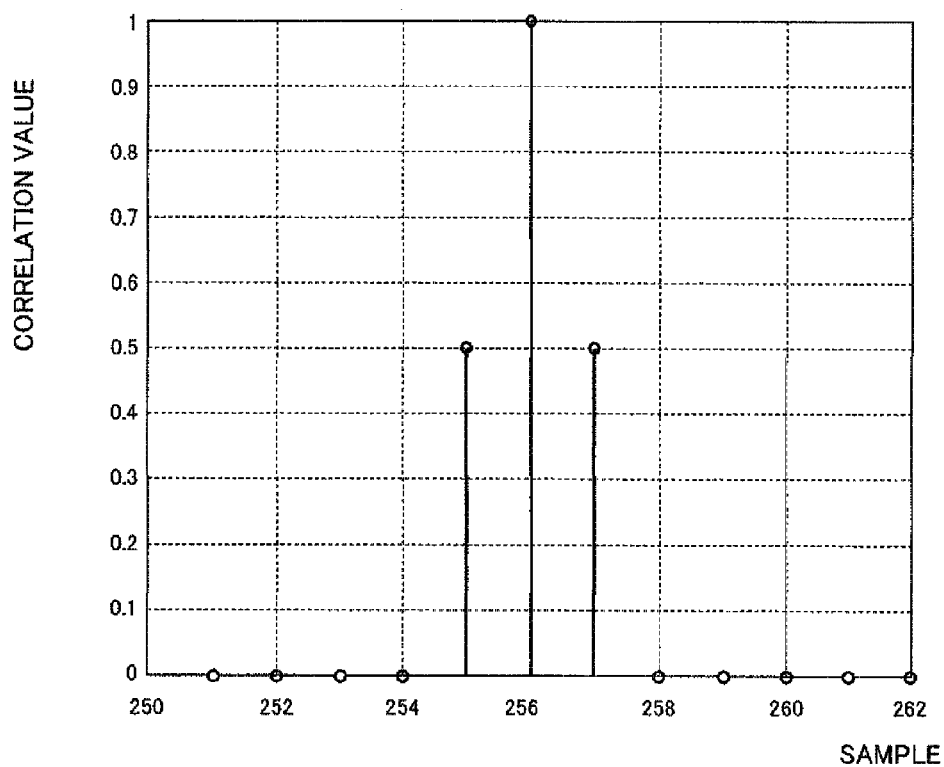
FIG. 26 shows an enlarged view of FIG. 25.

Meanwhile, FIG. 25 shows a correlation results when the CES is sampled by the same rate as the payload hit rate $B_p$. FIG. 26 shows an enlarged view of the 250-th through 262-th correlation values in FIG. 25. When sampling is performed by the same rate payload bit rate $B_p$, small peaks (hereinafter "sidelobes") appear on both sides of the largest peak at the 256-th sample.

Due to the influence of the presence of these sidelobes, cases occur where adequate correlation results cannot be obtained on a propagation path where there are delayed waves. Example correlation results obtained in the event the channel impulse response (CIR) can be represented by $h(t)=\delta(t)-0.5\delta(t-T)$, will be considered below.

Figure 27:
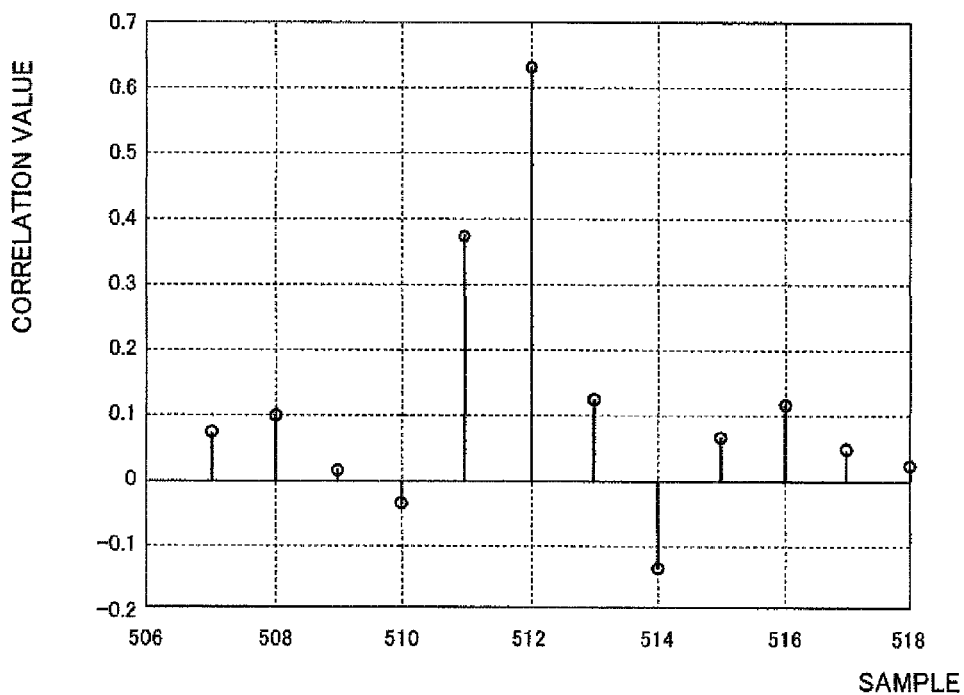
FIG. 27 shows an example of correlation results in the event a CES is sampled at a double rate in an environment where there are delayed waves.

FIG. 27 shows an enlarged view of the 506-th through 518-th correlation values among the correlation results obtained by sampling a CES having a length of 256 bits by a rate twice the CES bit rate. As shown in FIG. 27, peaks (i.e. sidelobes) that really are not supposed to exist, are detected before the 512-th peak corresponding to the direct wave. A peak does not appear at the 513-th sample where a delayed wave is supposed to be detected.

When a CES is thus detected by a faster rate than CES bit rate $B_{CES}$, cases might occur where correlation results are not adequate. As a result of this, in subsequent channel estimation section 104, it is difficult to perform channel estimation correctly.

Then, with the present embodiment, a channel estimation section and channel estimation method to perform channel estimation using sample values obtained by performing sampling by a faster rate than the CES bit rate, will be described.

Figure 28:
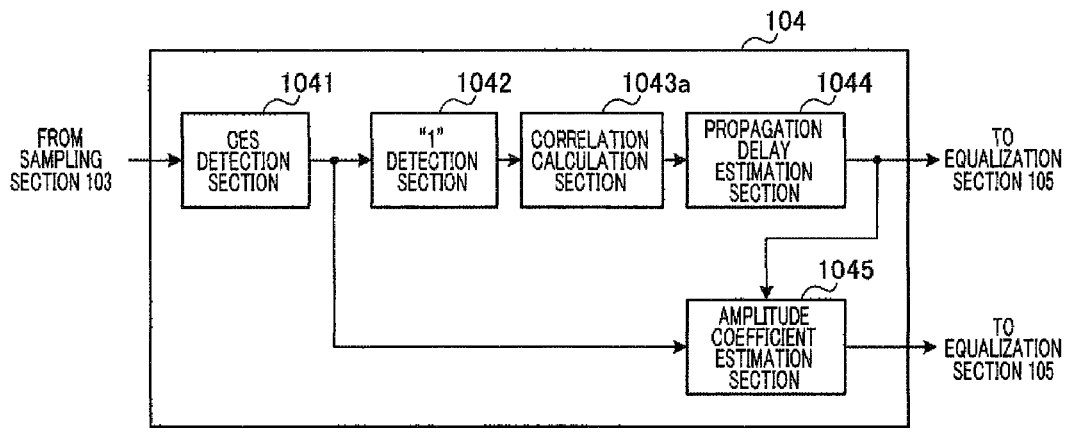
FIG. 28 is a block diagram showing a principal-part configuration of a channel estimation section according to embodiment 2 of the present invention.

FIG. 28 shows a principal-part configuration of the channel estimation section according to the present embodiment. Parts in the channel estimation section of the present embodiment shown in FIG. 28 that are the same as in FIG. 19 will be assigned the same codes as in FIG. 19 and will not be explained. Compared with FIG. 19, FIG. 28 provides correlation calculation section 1043a instead of correlation calculation section 1043.

Correlation calculation result 1043a, performs correlation calculation using sample values obtained by performing sampling by a faster rate than CES bit rate $B_{CES}$ and afterward corrects the correlation calculation.

Figure 30:
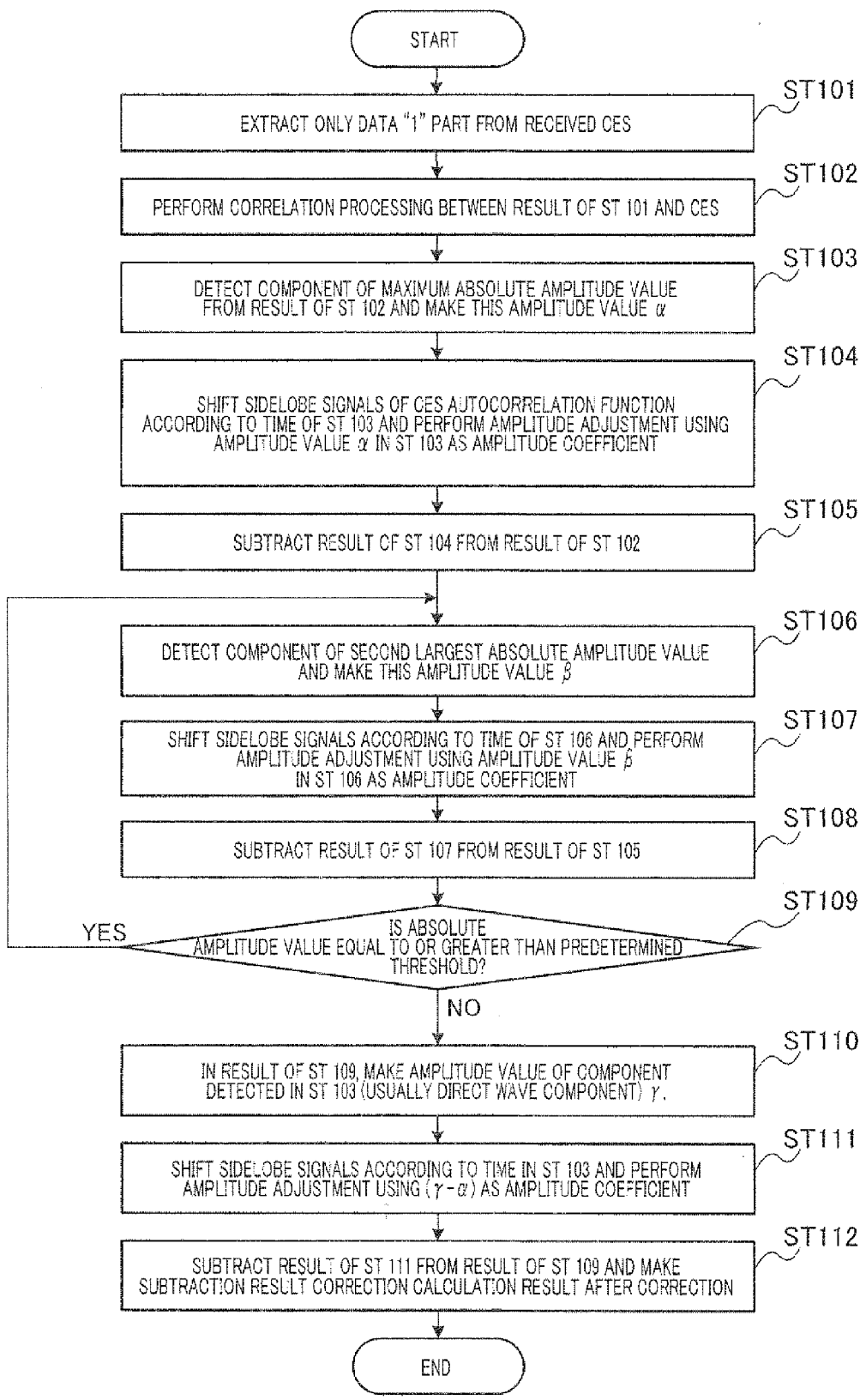
FIG. 30 is a flowchart showing operations of a correlation calculation section according to embodiment 2.

The method of correlation calculation correction in correlation calculation section 1043a will be described using the flowchart of FIG. 30. In FIG. 30, "ST" stands for each step of the flow.

"1" detection section 1042 extracts only parts corresponding to data "1" from the received CES (ST 101). Correlation calculation section 1043a performs correlation processing between the result of ST 101 and the CES (ST 102). Furthermore, correlation calculation section 1043a detects the component of the maximum absolute amplitude value from the result of ST 102 (usually the direct wave component), and makes this amplitude value α (ST 103). Correlation calculation section 1043a prepares in advance sidelobe signals in the CES autocorrelation results. Correlation calculation section 1043a shifts the sidelobe signals in the autocorrelation results of the CES according to the time of ST 103, and performs amplitude adjustment using amplitude value α in ST 103 as an amplitude coefficient (ST 104).

Correlation calculation section 1043a subtracts the result of ST 104 from the result of ST 102 (ST 105), and detects the component of the second largest absolute amplitude value from the result of ST 105 and makes this amplitude value β (ST 106). Correlation calculation section 1043a shifts the sidelobe signals according to the time of ST 106 and performs amplitude adjustment using amplitude value β in ST 106 as an amplitude coefficient (ST 107). Correlation calculation section 1043a subtracts the result of ST 107 from the result of ST 105 (ST 108). Correlation calculation section 1043a repeats ST 106 through ST 108 for components having absolute amplitude values equal to or above a predetermined threshold (ST 109: YES).

When an absolute amplitude value is less than a predetermined threshold (ST 109: NO), correlation calculation section 1043a makes the amplitude value of component detected in ST 103 (usually the direct wave component) γ (ST 110). Next, correlation calculation section 1043a shifts the sidelobe signals according to the time of ST 103 and performs amplitude adjustment using (γ-α) as an amplitude coefficient (ST 111). Correlation calculation section 1043a subtracts the result of ST 111 from the result of ST 109 and uses the subtraction result as the correlation calculation result after correction (ST 112).

By this means, correlation calculation section 1043a, given correlation results, removes the sidelobes in the autocorrelation results, step by step, from the component of the largest absolute amplitude value using its amplitude value as a coefficient. By repeating this processing, the amplitude values of detected path components are corrected gradually. Then, finally, with the component having the largest absolute amplitude value (usually the direct wave component), the difference between the amplitude before correction and the amplitude value after correction is found, and, using this difference as a coefficient, the sidelobes are removed once again.

Figure 29:
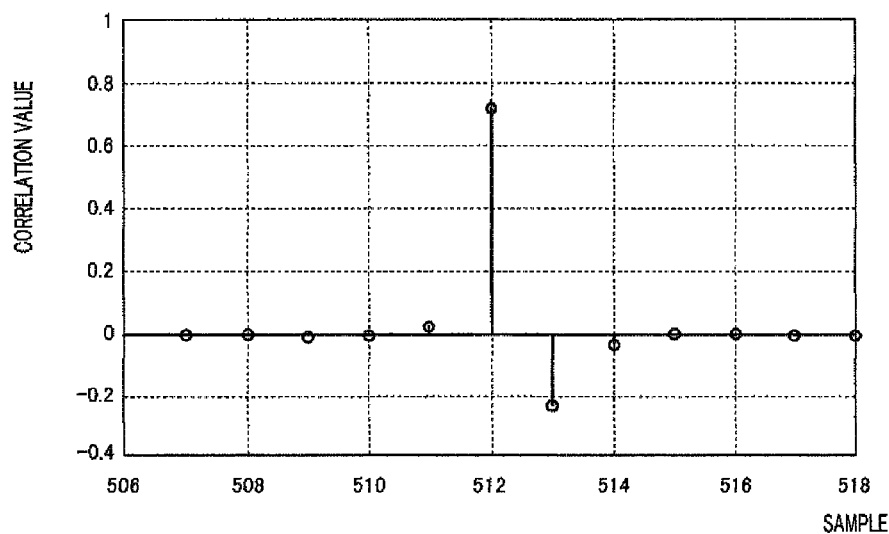
FIG. 29 shows a result of applying sidelobe removing processing to the autocorrelation results shown in FIG. 27.

FIG. 29 shows a result of applying the above sequence of processing (ST 103 through ST 112) to FIG. 27. Based on the above processing, the peak having existed at the 511-th sample is not present, and a peak appears at the 513-th sample where a delayed wave really is supposed to be present.

As described above, according to the present embodiment, when sampling section 103 samples a CES by a faster rate than CES bit rate $B_{CES}$, correlation calculation section 1043a performs amplitude adjustment by multiplying sidelobe signals in autocorrelation results by maximum absolute amplitude value α in the autocorrelation results of the CES and afterward subtracts the sidelobe signals after amplitude adjustment from the autocorrelation results. Correlation calculation section 1043a repeats the process performing amplitude adjustment of sidelobe signals by multiplying the sidelobe signals by maximum absolute amplitude value β among the results after subtraction and furthermore subtracting the sidelobe signals after amplitude adjustment from the results after subtraction, until the results after subtraction reach or fall below a predetermined threshold.

By this means, even when sampling section 103 samples a CES by a faster rate than CES bit rate $B_{CES}$, correlation calculation section 1043a cancels unnecessary sidelobes, and, by reproducing the influence of delayed waves, obtains adequate correlation calculation results. As a result of this, subsequent channel estimation section 1044 and amplitude coefficient estimation section 1045 are able to perform adequate channel estimation.

Embodiment 3

In embodiment 1 and embodiment 2 above, channel estimation was performed using a sequence having an impulse autocorrelation, as a channel estimation sequence (CES). A channel estimation section and channel estimation method will be described with the present embodiment whereby channel estimation is performed using a different sequence from the channel estimation sequences (CESs) of embodiment 1 and embodiment 2. As in embodiment 1 and embodiment 2, the channel estimation section according to the present embodiment performs channel estimation using amplitude information obtained by envelope detection.

Figure 31:
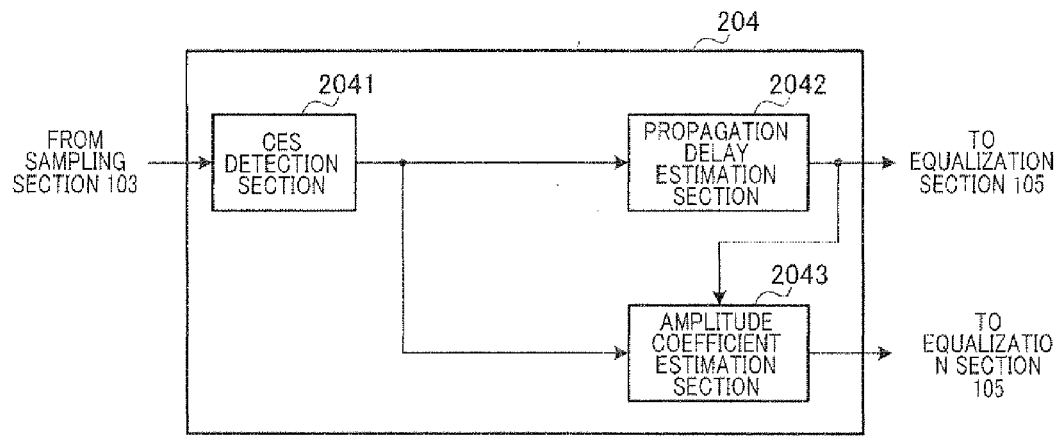
FIG. 31 is a block diagram showing a principal-part configuration of a channel estimation section according to embodiment 3 of the present invention.

FIG. 31 shows a principal-part configuration of the channel estimation section according to the present embodiment. The channel estimation section according to the present embodiment can be used instead of channel estimation section 104 of receiving apparatus 100 of FIG. 7.

Channel estimation section 204 in FIG. 31 is formed with CES detection section 2041, propagation delay estimation section 2042 and amplitude coefficient estimation section 2043.

CES detection section 2041 detects the CES from the sample values of a detected signal output from sampling section 103. The method of CES detection is not particularly limited and various methods can be used. For example, a detection method, in which CES detection section 2041 has a matched filter and determines that a CES has been detected when a matched filter output exceeds a predetermined value, may be used.

With the present embodiment, a sequence formed with the following three types, $CES_1$, $CES_2$ and $CES_3$, is used as the CES.

(1) $CES_1$: formed entirely with data "0"
(2) $CES_2$: only the first item of data is "1" and the rest of the data is "0"
(3) $CES_3$: formed entirely with data "1"

Figure 32:
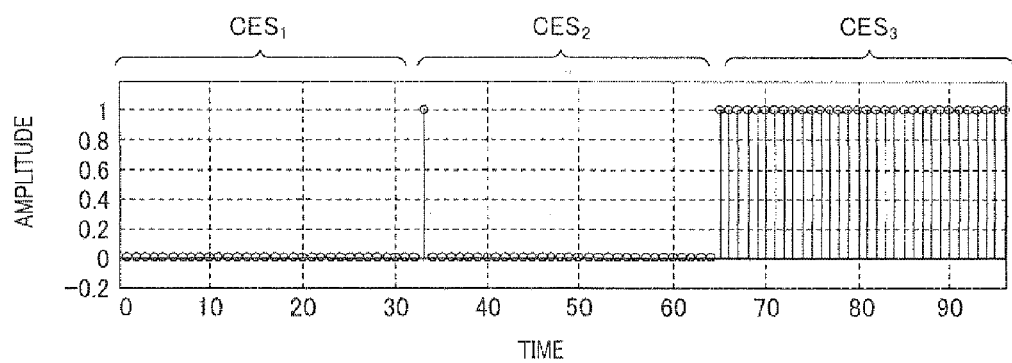
FIG. 32 shows an example of a CES according to embodiment 3.
Figure 33:
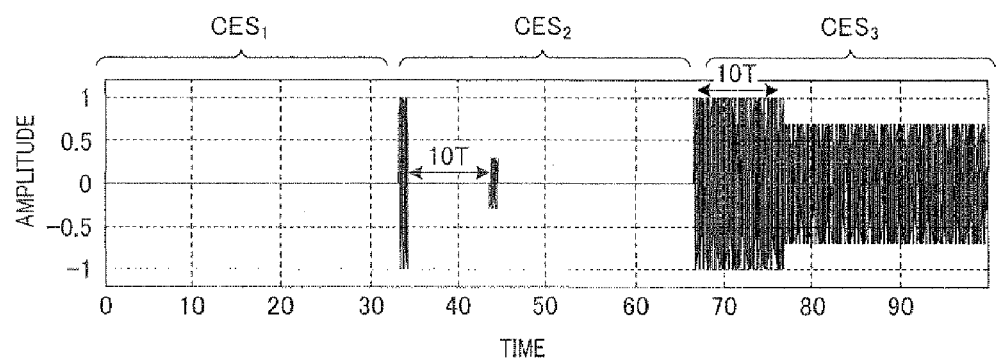
FIG. 33 shows a received signal of the CBS shown in FIG. 32 in an environment where there are delayed waves.
Figure 34:
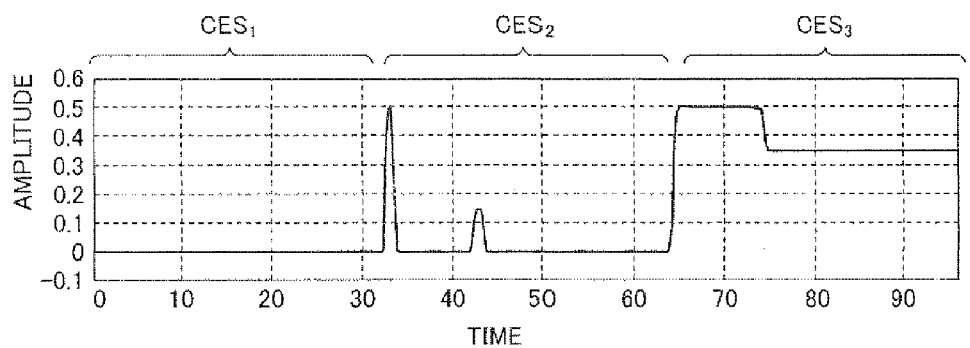
FIG. 34 shows a detected signal obtained by performing envelope detection of the received signal in FIG. 33.
Figure 35:
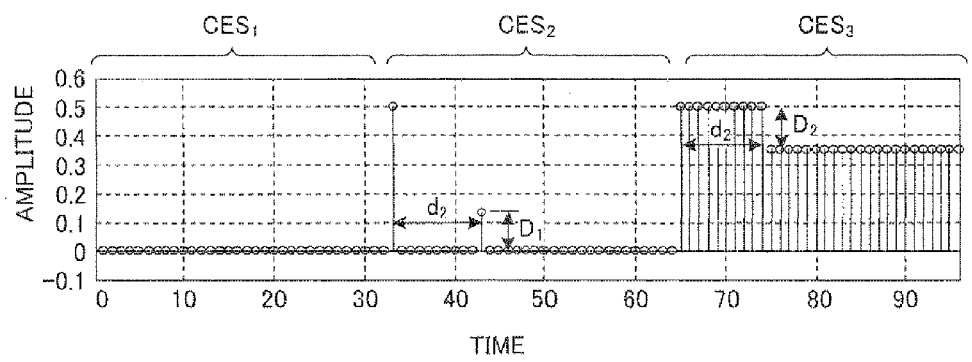
FIG. 35 shows sample values obtained by sampling the detected signal of FIG. 34.

FIG. 32 shows, as an example, $CES_n$(n=1, 2, 3) of a length of 32 symbols. Furthermore, FIG. 33 shows the waveform of a received signal when the CES shown in FIG. 32 is transmitted. FIG. 33 shows the waveform of a received signal in an environment where the channel impulse response (CIR) is represented by $h(t)=\delta(t)-0.3\delta(t-10T)$. Furthermore, FIG. 34 shows a detected signal after envelope detection of the received signal shown in FIG. 33. FIG. 35 shows the sample values of the detected signal shown in FIG. 34.

CES detection section 2041, upon detecting a CES, outputs the CES detection timing to propagation delay estimation section 2042. CES detection section 2041 outputs detected signal sample values output from sampling section 103, to channel estimation section 2042 and amplitude coefficient estimation section 2043.

Channel estimation section 2042 estimates propagation delay amount $d_n$ from the sample values. To be more specific, propagation delay estimation section 2042 detects a sample value exceeding a predetermined threshold other than the first data item in the $CES_2$ period, as a delayed wave. Then, propagation delay estimation section 2042 calculates propagation delay amount $d_2$ of the delayed wave by subtracting the time the first data "1" in $CES_2$ is detected from the time the delayed wave is detected.

For example, in the example shown in FIG. 35, if the 33-th symbol is detected as the first data "1" in $CES_2$ and the 43-th symbol is detected as a delayed wave, propagation delay estimation section 2042 obtains $d_2=10$ from $d_2=43-33$.

Propagation delay estimation section 2042 is also able to determine the amount of phase fluctuation with a delayed wave according to the amount of sample value fluctuation after propagation delay amount $d_2$ in the $CES_3$ period. Propagation delay estimation section 2042 determines that the phase of a delayed wave is in in-phase with the phase of the direct wave in the event sample values after propagation delay amount $d_2$ increase. Propagation delay estimation section 2042 determines that the phase of a delayed wave is in anti-phase with the phase of the direct wave in the event sample values after propagation delay amount $d_2$ decrease.

Propagation delay estimation section 2042 output estimated propagation delay amount $d_n$ to amplitude coefficient estimation section 2043 and equalization section 105.

Amplitude coefficient estimation section 2043 estimates amplitude coefficient $A_n$ and amplitude fluctuation $D_n$ of the channel impulse response (CIR). In the example shown in FIG. 35, in the $CES_3$ period, the amplitude of the received signal decreases 10 symbols after the beginning. As shown above, $CES_1$ is comprised entirely of "0," so that amplitude coefficient $A_1$ of the direct wave can be found from the amplitude of the sample value at the beginning of $CES_2$, that is, from the amplitude of the 33-th sample value in FIG. 35.

Furthermore, from the sample values detected, amplitude coefficient estimation section 2043 subtracts the sample values of data "0" (for example, an average sample value in the $CES_2$ period may be used) in an environment where there are no delayed waves, and finds amplitude fluctuation $D_1$ which data "1" causes to data "0" by way of interference.

Furthermore, in the $CES_3$ period, amplitude coefficient estimation section 2043 subtracts the sample values of data "1" (for example, the sample value at the beginning of the $CES_3$ period may be used) in an environment where there are no delayed waves, from the sample value $d_2$ symbols from the beginning of the $CES_3$ period and later sample values. By this means, amplitude coefficient estimation section 2043 finds amplitude coefficient $D_2$ which data "1" causes to data "1,"

Amplitude coefficient estimation section 2043 thus finds amplitude coefficient $D_1$ which data "1" causes to data "0" and amplitude coefficient $D_2$ which data "1" causes to data "1."

As described above, the present embodiment is designed to perform channel estimation using a CES comprised of $CES_1$ formed entirely with data "0," $CES_2$, in which only the first data item is "1" and the rest of the data is "0," and $CES_3$ formed entirely with data "1."

With embodiment 1 and embodiment 2, channel estimation section 104 calculates amplitude fluctuation $D_n$ based on whether or not the currently received data or earlier ($d_2-d_1$ symbol earlier) data are "1." By contrast with this, with the present embodiment, amplitude fluctuation $D_n$, can be calculated from the amplitude of the current sample value alone, without using earlier data demodulation results. Consequently, as compared with embodiment 1 and embodiment 2, channel estimation can be performed by a comparatively simple method.

The disclosure of Japanese patent application No. 2008-222097, filed on Aug. 27, 2008, including the specification, drawings and abstract, is incorporated herein by reference in its entirety.

INDUSTRIAL APPLICABILITY

The receiving apparatus and channel estimation method according to the present embodiment enable adequate channel estimation using amplitude information of received signals. For example, the receiving apparatus and propagation estimation method according to the present embodiment are applicable for use as a receiving apparatus and channel estimation method for performing channel estimation using amplitude information of received signals obtained by means of envelope detection and so forth in a system using an OOK-modulation scheme.

REFERENCE SIGNS LIST

100 Receiving apparatus
101 Antenna
102 Detection section
103 Sampling section
104, 204 Channel estimation section
105 Equalization section
106 Binarizing section
1041, 2041 CES detection section
1042 "1" detection section
1043, 1043a Correlation calculation section
1044, 2042 Propagation delay estimation section
1045, 2043 Amplitude coefficient estimation section

The invention claimed is:

1. A receiving apparatus comprising:
a detection section that performs envelope detection of an on-off keying modulated signal sequence to obtain a detected signal sequence, the on-off keying modulated signal sequence being obtained by performing on-off keying of a known channel estimation sequence formed with data 0 and 1;
an extracting section that extracts only a detected signal corresponding to data 1 from the detected signal sequence to obtain an extracted signal sequence;
a correlation section that calculates a correlation between the extracted signal sequence and the channel estimation sequence; and
an estimation section that estimates a channel characteristic based on a result of the correlation calculation.

2. The receiving apparatus according to claim 1, wherein the extracting section obtains the extracted signal sequence by replacing detected signals corresponding to data 0 in the detected signal sequence with 0.

3. The receiving apparatus according to claim 1, further comprising:
a binarizing section that binarizes the detected signal sequence to obtain a demodulation result; and
an equalization section that performs equalization processing using the channel estimation sequence, the detected signal sequence, and an earlier demodulation result.

4. The receiving apparatus according to claim 3, wherein the equalization section corrects an amplitude of the detected signal sequence based on the delay time, amplitude values corresponding to data 0 and 1 not interfered with by a delayed wave in the channel estimation sequence, an amplitude fluctuation which the delayed wave causes to data 0 and 1 in the channel estimation sequence, and an earlier data demodulation result.

5. The receiving apparatus according to claim 1, wherein the estimation section calculates a delay time of a delayed wave with respect to a direct wave based on the result of the correlation calculation.

6. The receiving apparatus according to claim 5, wherein the estimation section estimates an amplitude coefficient of a channel using the delay time, the channel estimation sequence and the detected-signal sequence.

7. The receiving apparatus according to claim 1, wherein:
the detection section samples the channel estimation sequence by a faster rate than a bit rate of the channel estimation sequence to obtain the detected signal sequence; and
the correlation section corrects the result of the correlation calculation based on a sidelobe signal of the result of the correlation calculation and a maximum absolute amplitude value of the result of the correlation calculation.

8. A channel estimation method comprising:
performing envelope detection of an on-off keying modulated signal sequence and obtaining a detected signal sequence, the on-off keying modulated signal sequence being obtained by performing on-off keying of a known channel estimation sequence formed with data 0 and 1;
extracting only a detected signal corresponding to data 1 from the detected signal sequence and obtaining an extracted signal sequence;
calculating a correlation between the extracted signal sequence and the channel estimation sequence; and
estimating a channel characteristic based on a result of the correlation calculation.

* * * * *